US012780274B2

(12) United States Patent
Resta

(10) Patent No.: US 12,780,274 B2

(45) Date of Patent: Nov. 3, 2026

(54) END OF TRAIN DEVICE AND INTEGRATED LiDAR MONITORING SYSTEM

(71) Applicant: Siemens Mobility, Inc., New York, NY (US)

(72) Inventor: Jose Luis Tondi Resta, Louisville, KY (US)

(73) Assignee: Siemens Mobility, Inc., New York, NY (US)

(*) Notice: Subject to any disclaimer, the term of this patent is extended or adjusted under 35 U.S.C. 154(b) by 1082 days.

(21) Appl. No.: 17/649,850

(22) Filed: Feb. 3, 2022

(65) Prior Publication Data

US 2022/0268936 A1 Aug. 25, 2022

Related U.S. Application Data

(60) Provisional application No. 63/152,882, filed on Feb. 24, 2021.

(51) Int. Cl.

| | |
|---|---|
| ***B61L 23/34*** | (2006.01) |
| ***B60T 13/66*** | (2006.01) |
| ***B60T 17/22*** | (2006.01) |
| ***B61L 15/00*** | (2006.01) |
| ***B61L 23/04*** | (2006.01) |
| ***G01S 17/87*** | (2020.01) |
| ***G01S 17/89*** | (2020.01) |

(52) U.S. Cl.

CPC ........ *B61L 15/0054* (2013.01); *B60T 13/662* (2013.01); *B60T 17/228* (2013.01); *B61L 15/0072* (2013.01); *B61L 23/041* (2013.01); *B61L 23/34* (2013.01); *G01S 17/87* (2013.01); *G01S 17/89* (2013.01)

(58) Field of Classification Search

CPC ............. B61L 15/0054; B61L 15/0027; B61L 15/0072; B61L 2205/04; B61L 23/041; B61L 25/025; B61L 23/34; B60T 13/662; B60T 17/228; B60T 13/665; B60T 2210/32; G01S 17/87; G01S 17/89

USPC ...................................................... 246/167 D

See application file for complete search history.

(56) References Cited

U.S. PATENT DOCUMENTS

| | | | | |
|---|---|---|---|---|
| 2010/0213321 | A1* | 8/2010 | Kane | B61L 25/025 246/167 R |
| 2016/0121912 | A1* | 5/2016 | Puttagunta | B61L 23/041 701/19 |
| 2016/0221592 | A1* | 8/2016 | Puttagunta | B61L 27/04 |
| 2017/0066459 | A1* | 3/2017 | Singh | H04N 23/90 |
| 2020/0189631 | A1* | 6/2020 | Gorman | B61L 15/0072 |
| 2020/0207385 | A1* | 7/2020 | Kernwein | B61L 15/0027 |
| 2020/0207389 | A1* | 7/2020 | Moth | B61L 25/025 |
| 2020/0363532 | A1* | 11/2020 | Mesher | G01S 7/497 |
| 2021/0188299 | A1* | 6/2021 | Claussen | B60W 30/18036 |
| 2023/0202540 | A1* | 6/2023 | Ono | G01S 5/00 246/120 |

* cited by examiner

*Primary Examiner* — Zachary L Kuhfuss

(57) ABSTRACT

An end of train device (EOT) suitable of use on a railway vehicle includes a mounting unit for installation on a car of a railway vehicle, an enclosure housing a plurality of electronic components, and an illumination device configured to illuminate a section of a surrounding area of the railway vehicle, to receive reflected light and to measure time for the reflected light to return to the illumination device for monitoring purposes of the surrounding area. Further, a monitoring system and a monitoring method are described.

14 Claims, 2 Drawing Sheets

END OF TRAIN DEVICE AND INTEGRATED LiDAR MONITORING SYSTEM

CROSS REFERENCE TO RELATED APPLICATIONS

This application claims benefit of U.S. provisional application No. 63/152,882 filed Feb. 24, 2021, in the United States Patent and Trademark Office, the content of which is herein incorporated by reference in its entirety.

BACKGROUND

1. Field

Aspects of the present disclosure generally relate to railway monitoring systems, specifically monitoring systems including end of train devices and light detection and ranging (LiDAR) technology. Further aspects relate to railway monitoring systems in combination with communications between an end of train device, a head of train device or a remote monitoring device, in connection with a railroad vehicle.

2. Description of the Related Art

Within the railway industry, an end of train device, herein also referred to as EOT, is an electronic device which performs a number of functions, some of which are required by regulations of the Federal Railroad Administration (FRA). The EOT is typically attached at a rear of a last car on a railway vehicle or train, often to an unused coupling on an end of the last car opposite a head of the train.

For example, an EOT can monitor air pressure in the air brake pipe and transmit this information to a head of train device, herein also referred to as HOT. The HOT is attached at a first car on the train, for example a locomotive, opposite the EOT. Further, EOTs also often include an end-of-train marker light to alert trailing trains on the same track of the presence of the end of the train. Two-way EOTs can accept commands from the HOT, for example to open a valve to release pressure in the air brake pipe so that the train's air brakes activate to stop the train in an emergency. EOTs and HOTs can comprise many other components and/or functions.

Another function of an EOT may include monitoring surrounding area(s) behind a train, for example to detect close objects, accidents or other approaching trains. Solutions have been presented using regular video cameras integrated with the EOT to monitor the surrounding areas behind the train. However, in adverse environmental conditions or low illumination conditions, video cameras are unable to provide proper visibility hindering capabilities of providing information the video cameras intend to provide.

SUMMARY

Briefly described, aspects of the present disclosure relate to railway monitoring systems, specifically monitoring systems including end of train devices and light detection and ranging (LiDAR) technology. Further aspects relate to railway monitoring systems in combination with communications between an EOT and another device or system, such as a HOT, a remote (external) monitoring system or a remote server. The monitoring systems, EOT and HOT are suitable for railway vehicles such as freight trains and passenger trains.

A first aspect of the present disclosure provides an end of train device (EOT) suitable of use on a railway vehicle comprising a mounting unit for installation on a car of a railway vehicle, an enclosure housing a plurality of electronic components, and an illumination device configured to illuminate a section of a surrounding area of the railway vehicle, to receive reflected light and to measure time for the reflected light to return to the illumination device for monitoring purposes of the surrounding area.

A second aspect of the present disclosure provides a monitoring system for a railway vehicle, the monitoring system comprising a first monitoring device configured as end of train device (EOT), a second monitoring device, a communication link between the EOT and the second monitoring device, wherein the EOT comprises an illumination device configured to illuminate a section of a surrounding area of the railway vehicle, and to receive reflected light, and wherein the EOT is configured to communicate data, provided by the illumination device, to the second monitoring device for monitoring of the surrounding area.

A third aspect of the present disclosure provides a monitoring method for a railway vehicle, the method comprising illuminating, by a first monitoring device configured as an end of train device (EOT), a section of a surrounding area of the railway vehicle, and receiving reflected light, obtaining data including time for the reflected light to return to the EOT, and transmitting the data obtained by the EOT to a second monitoring device.

DETAILED DESCRIPTION

To facilitate an understanding of embodiments, principles, and features of the present disclosure, they are explained hereinafter with reference to implementation in illustrative embodiments. In particular, they are described in the context of electronic train devices, such as for example EOT and HOT, and railway monitoring systems in combination with light detection and ranging (LiDAR) technology.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
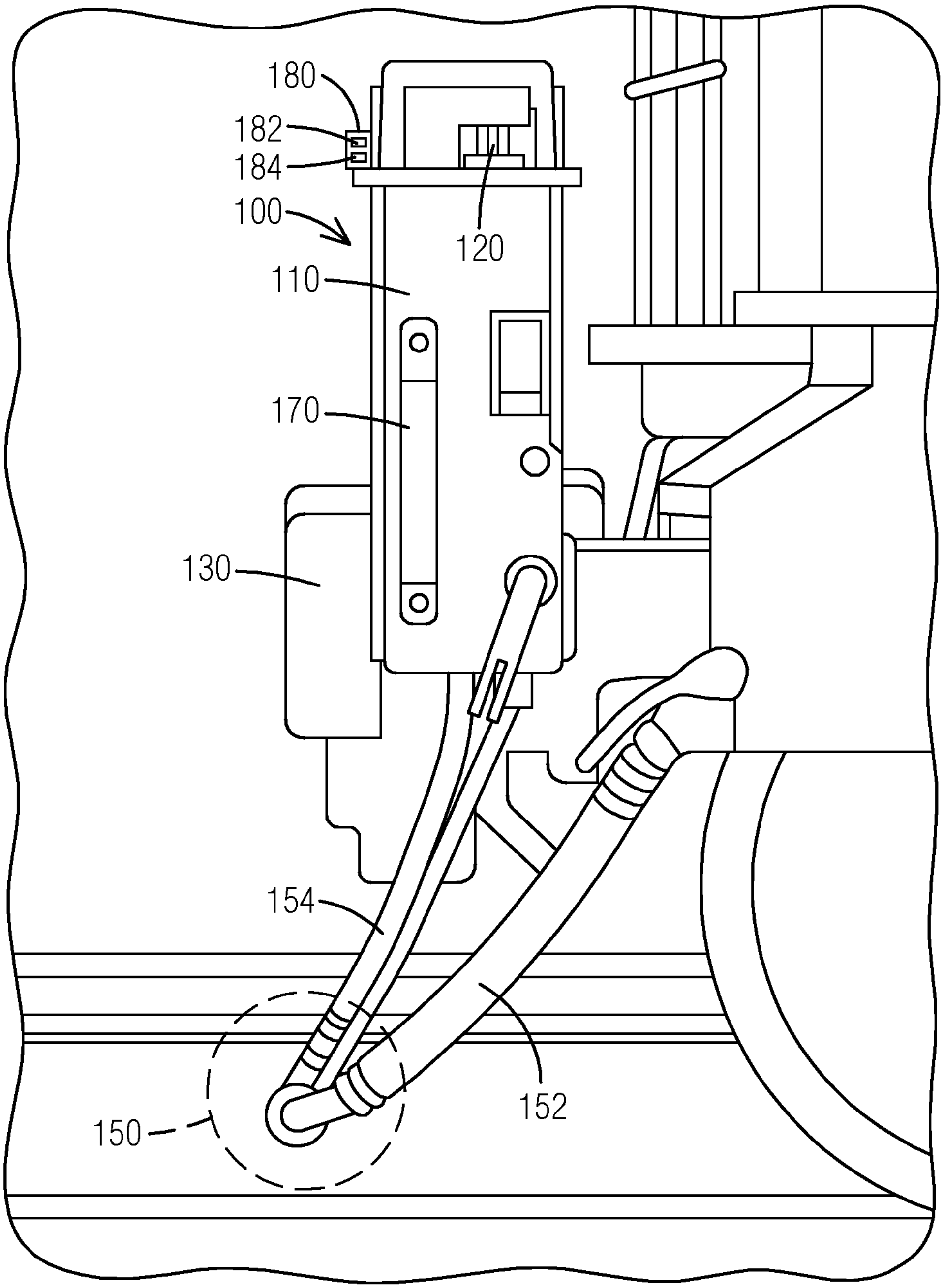
FIG. 1 illustrates an EOT attached to a coupling of a car of a railway vehicle in accordance with an exemplary embodiment of the present disclosure.

FIG. 1 illustrates EOT 100 attached to a coupling of a car of a railway vehicle in accordance with an exemplary embodiment of the present disclosure.

EOT 100 is installed on a last car of railway vehicle via a mounting unit, typically coupled to an unused coupling 130 of the last car of the railway vehicle. EOT 100 comprises a handle 170 attached to the housing 110 for handling such as installation and removal of the EOT 100 on/off the car of the railway vehicle.

Further, the EOT 100 comprises an enclosure 110, and a plurality of components, such as electric/electronic components, positioned inside the enclosure 110. For example, one or more displays 120 are positioned inside the enclosure 110 which display information and/or data provided by the EOT 100. Examples of other components of the EOT 100 include a high visibility marker light (HVM), cell phone transceivers, systems for monitoring/controlling brake lines and pressure, communication systems for communicating with other units, such as for example HOTs. FIG. 1 illustrates a brake pipe connection 150 between a brake hose 252 of the railway vehicle and a hose 154 of the EOT 100 which is monitored by EOT 100. It should be noted that one of ordinary skill in the art is familiar with structure, components and functions of different types of EOTs, and they will not be described in further detail herein.

As described earlier, another function of EOT 100 may include monitoring surrounding area(s) behind a train, specifically reliably monitoring surrounding area(s) in adverse environmental, e. g. snow, rain, or low lighting conditions.

Thus, in an exemplary embodiment of the present disclosure, the EOT 100 comprises an illumination device 180, herein also referred to as first monitoring device, configured to illuminate a section of a surrounding area of the railway vehicle, to receive reflected light and to measure time for the reflected light to return to the illumination device 180 for monitoring purposes of the surrounding area. The EOT 100 may comprise one or more illumination device(s) 180.

The illumination device 180 is configured to illuminate and/or monitor the surrounding area behind the railway vehicle, specifically during operation of the railway vehicle. While illuminating, the illumination device 180 scans surroundings and periphery behind the railway vehicle and obtains data and information which are then processed and evaluated.

The illumination device 180 is mounted or coupled to the EOT 100, for example on an outside of the enclosure 110. It should be noted that the illumination device 180 may be mounted on various spots/locations of the EOT 100, inside or outside of the enclosure 110, if suitable for the intended purposes. Generally, the illumination device 180 should be mounted such that a targeted area behind the train can be scanned and monitored.

The illumination device 180 comprises transmitter 182 and a receiver 184, wherein the transmitter 182 is configured to emit light, and wherein the receiver 184 is configured to receive the reflected light and to measure the time for the reflected light to return to the receiver 184. Signals and data, such as position data, time data and light data (for example when/where light was emitted and reflected light received), are subject to signal/data processing, which may be performed by the EOT 100, for example the illumination device 180 or another component of the EOT 100, or by another system or device, for example by a HOT or by an external or remote monitoring system.

In an embodiment, the illumination device 180 comprises or is configured as a LiDAR sensor. LiDAR stands for "Light Detection and Ranging" and is a surveying method that measures distance to a target by illuminating that target with a laser light, for example pulsed laser light at 905 nm, and measures reflected pulses with a sensor. Differences in laser return times (time of flight) and wavelengths return a point cloud from which a digital 3D reconstruction of the target can be created. The EOT 100 may comprise one or more LiDAR sensors.

The illumination device 180, e. g. LiDAR sensor, comprises at least one laser beam configured to scan the area(s) behind the train according to specifications, for example to scan an area over a sector or a specific angle range, vertically and/or horizontally, in a specified period. Horizontal and/or vertical angles/ranges for scanning may vary, and a horizontal angle range may be different than a vertical angle range. For example, the at least one laser beam may scan, for example via rotation, the area(s) multiple times per second or minute.

Further, the EOT 100 comprises a global positioning system (GPS) receiver or a global navigation satellite system (GNSS) receiver, typically housed within the enclosure 110. The GPS receiver or GNSS receiver may be used to determine position and orientation of the illumination device 180, which is necessary to create correct reconstructions of the scanned area(s) behind the railway vehicle.

In an embodiment, the EOT 100, for example the illumination device 180, is configured to process the signals and data including time and position data, create a point cloud, image and/or reconstruction of the surrounding area and transmit the point cloud, digital image and/or digital reconstruction to a head of train device (HOT), remote server and/or external monitoring system. Thus, the EOT 100 and/or illumination device 180 may comprise a processing unit for the data/signal processing and creating the digital image(s) or reconstruction(s).

In another embodiment, the EOT 100 comprises a communication module configured to transmit data including the measured time and position data to a head of train device (HOT), a remote server or an external monitoring system for further processing. Specifically, the EOT 100 is configured to transmit raw and/or partially processed time and position data, and wherein the HOT, remote server or external monitoring system is configured to process the time and position data, and to create a point cloud, digital image and/or reconstruction of the surrounding area.

Figure 2:
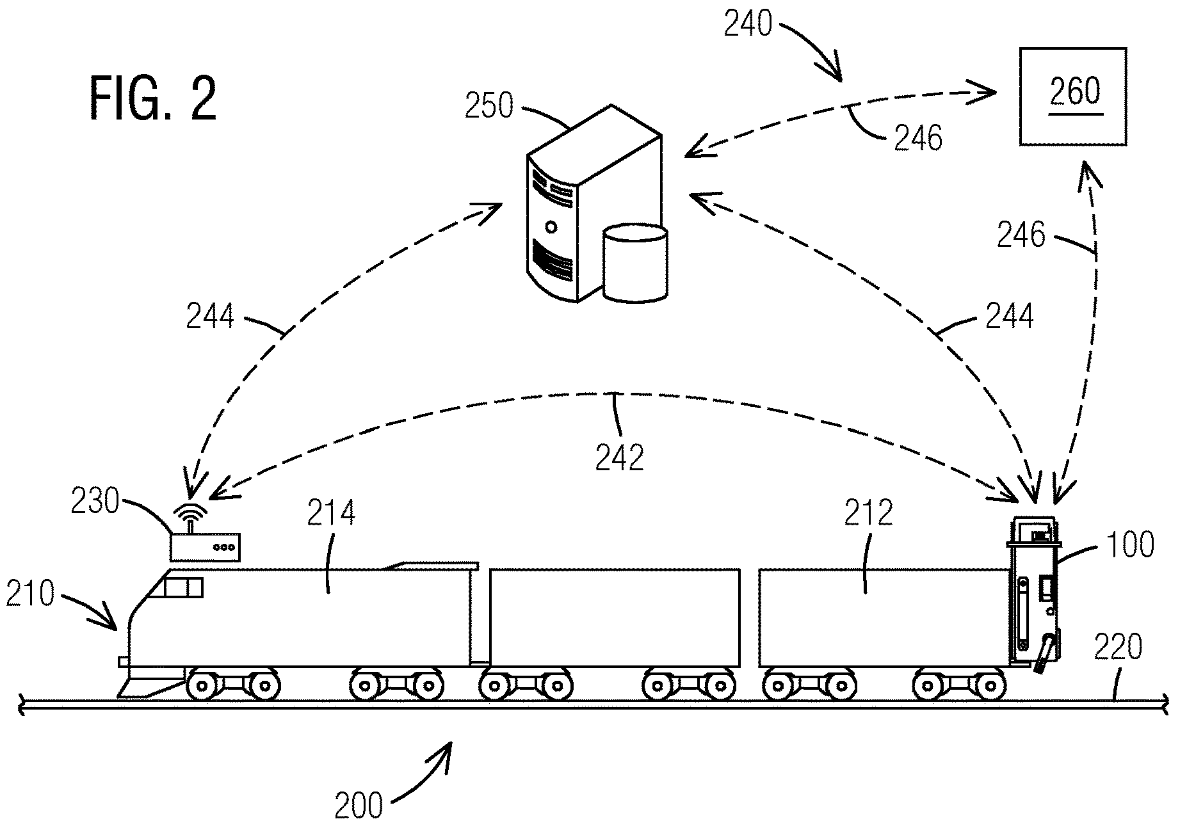
FIG. 2 illustrates a schematic of a monitoring and communications system in accordance with an exemplary embodiment of the present disclosure.

FIG. 2 illustrates a schematic of a monitoring and communications system 200 in accordance with an exemplary embodiment of the present disclosure.

In an exemplary embodiment of the present disclosure, monitoring and communications system 200 comprises a first monitoring device configured as EOT 100 coupled to a last car 212 of a railway vehicle (train) 210, travelling on railway tracks 220. System 200 further comprises a second monitoring device and communication link(s) or network 240 between the EOT 100 and the second monitoring device. It should be noted that components of FIG. 2 are only illustrated schematically and are not drawn to scale. For example, EOT 100 is significantly smaller than car 212 of railway vehicle 210.

The second monitoring device may be configured as HOT 230, located on the other end of the train 210, for example in locomotive 214 of train 210. In another embodiment, the second monitoring device comprises remote server 250 or a remote monitoring system or an external monitoring system 260. Remote server 250 or remote monitoring system may include a cloud-based server or monitoring system accessible for example via a web browser. External monitoring system 260 may include a monitoring system located for example in a rail operations center, and accessible locally on servers or computers of the rail operations center. In another example, the external monitoring system 260 may include external computers, for example portable handheld devices, such as a tablet, smartphone or laptop.

HOT 230 can be integrated into locomotive cab electronics or can be a standalone or console mounted unit. When used with EOT 100, the HOT 230 provides the locomotive engineer with important information regarding operation of the train 210. These conditions include brake pipe pressure and various status conditions. The EOT 100 transmits data via a telemetry link, for example radio-based telemetry, to the HOT 210 in the locomotive 214. In an example, the HOT 230 can be integrated into a Positive Train Control (PTC) system of the railway vehicle 210, specifically in the locomotive 214.

Further, the system 200 may include telemetry repeater(s), specifically in combination with EOT 100 and HOT 230, where communications may be compromised. For example, when a train is very long and a long distance/spacing between EOT 100 and HOT 230 may not guarantee successful transmission of messages, one or more repeaters may be placed in certain locations on the train 210. Instead of a repeater, in certain trains, a locomotive placed in the middle of the composition may be equipped with a repeater that helps bridge gap(s) between the HOT 230 and EOT 100 on that train.

The EOT 100 can be configured as described for example with reference to FIG. 1 and comprises illumination device(s) 180, e. g. LiDAR sensor(s), configured to scan and monitor the surrounding area(s) behind the train 210. Further, EOT 100 is configured to communicate signals and data, provided and/or obtained by the illumination device(s) 180, to the second monitoring device for monitoring of the surrounding area(s). Signals and data provided and/or obtained by the illumination device 180, including time of flight of reflected light and position data of the illumination device 180, are communicated to the second monitoring device, that is to the HOT 230, and/or to the remote server 250, and/or the external monitoring system 260. Position data of the EOT 100, specifically of the illumination device 180, provided for example by GPS or GNSS receiver of the EOT 100, including position and orientation, are important to correctly create the point cloud and digital 3D reconstructions including correct distances and angles (orientation). Such reconstructions or images of targets behind the train 210 may include for example close objects, accidents, or other approaching trains.

The EOT 100 can be configured to either process the signals and data including time and position data, create a point cloud, image and/or reconstruction of the surrounding area itself, via an integrated processing unit, and transmit visualizations, e. g. point cloud, digital image and/or digital reconstruction, to another device/system, such as head of train device (HOT) 230, remote server 250 and/or external monitoring system 260. Or the EOT 100, utilizing illumination device 180, can be configured to collect the signals and data and provide collected raw signals and data or partially processed signals and data to the HOT 230 and/or remote system 250 and/or external system 260 for further processing, wherein the HOT 230 and/or remote system 250 and/or external system 260 is/are configured to reconstruct image(s) of the surrounding area.

In another exemplary embodiment, the monitoring system 200, for example via the second monitoring device, e. g. HOT 230 or remote system 250 or external monitoring system 260, is configured to visualize and display the surrounding area(s), based on the transmitted data by the EOT 100, in real time. For example, when transmitted to the HOT 230, a point cloud, digital image and/or 3D reconstruction of the monitored areas can be displayed in the locomotive via a display so that the locomotive engineer can monitor the areas and can act if necessary. The locomotive 214 in combination with integrated HOT 230 typically comprise a display or computer screen which may be used for displaying the monitored areas behind the train 210. As noted, visualizations, e. g. digital images or reconstructions of the surrounding area, can be received at the second monitoring device and then displayed, or raw and/or partially processed signals and data are received at the second monitoring device (230, 250, 260), wherein the second monitoring device itself creates the visualizations and displays the visualizations.

Communications network 240 can be for direct or indirect communication between the different components. EOT 100 and HOT 230 may directly communicate via radio-telemetry messages, see link 242. EOT 100 and HOT 230 may indirectly communicate, for example via a remote server 250 or remote base station, see links 244. EOT 100 may communicate to remote server/system 250, see link 244, or external device/system 250, see link 246, and may not communicate to HOT 230. Communication via or to remote server 250, or remote base station, or to external monitoring system 260 may be performed using wireless networks, such as for example wireless LAN (over Internet access point), cellular/mobile network(s) or other radio technology, such as for example via cellular V2X or via standard LTE (3G/4G/5G).

The EOT 100 can be configured to transmit the information of the illumination device 180 directly to the HOT 230 via a radio-based telemetry link. In another example, the EOT 100 can be configured to transmit the information indirectly to the HOT 230 via a remote server 250 or a remote base station. In yet another example, the EOT 100 can be configured to send the signals and data of the illumination device 180 to the remote server 250 or to the external monitoring system 260, but not to the HOT 230.

When communicated to the remote server 250 or external monitoring system 260, the remote server 250 or external monitoring system 260 may be configured to further communicate the signals and data to yet another system or may include a remote/external monitoring system capable of creating a point cloud from which a digital image/3D reconstruction of the target can be created and/or the display digital images/visualizations of the surrounding are created and communicated for example by the EOT 100.

In an example, for communication purposes, the EOT 100 comprises a communication module configured to transmit signals and data, such as raw or processed signals and data, including the measured time and position data, and/or visualizations or digital images of the surrounding area, to one or more devices, e. g. HOT 230 or remote server 250 or external device 260. Such a communication module may be embodied as software or a combination of software and hardware. The module may be a separate module or may be an existing module programmed to perform a method as described herein. For example, the communication module may be incorporated, for example programmed, into an existing device or module (of the EOT 100) by means of software. For example, such a communication module may be a radio module configured as software-defined radio.

In another exemplary embodiment of the present disclosure, the remote server 250 or remote/external monitoring system 260 may further process the signals and data received from the EOT 100, specifically the illumination device 180, along with location information (GPS/GNSS) of the EOT 100. For example, the remote server 250 can be configured to broadcast specific information to other trains in the vicinity, specifically to EOTs and HOTs of nearby trains. If an accident or other potentially dangerous incidents have been identified/located in a specific area, this information may be broadcasted to other trains in the vicinity.

Broadcasting this information helps other trains to avoid collision, or unnecessary delays.

Figure 3:
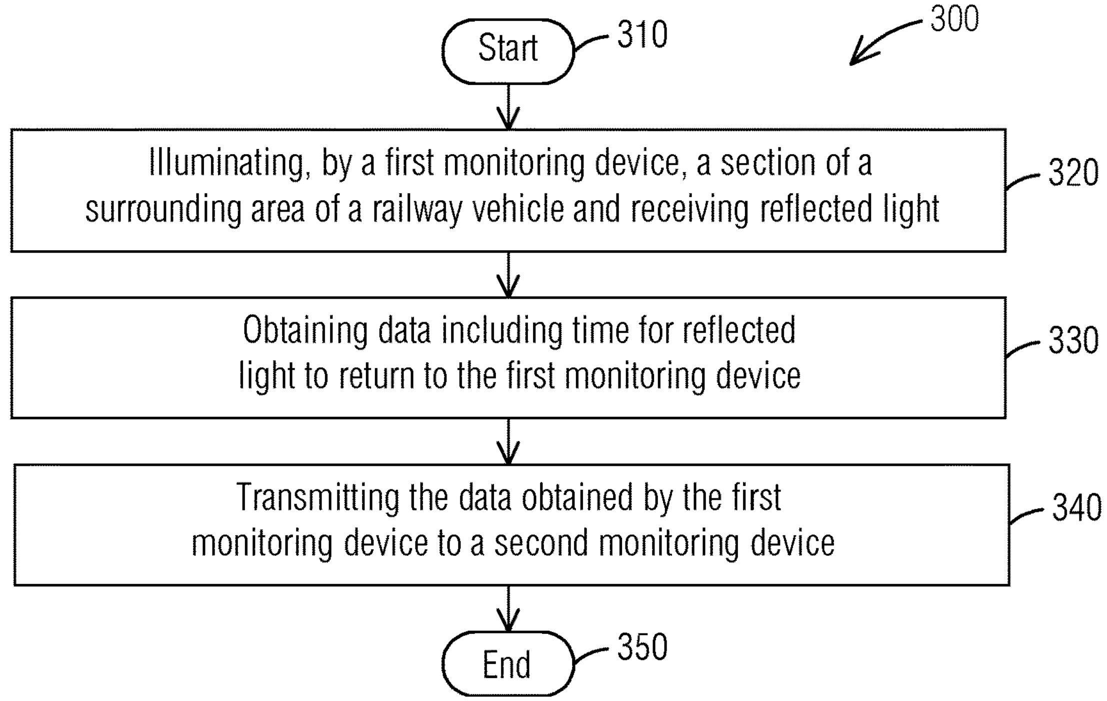
FIG. 3 illustrates a flow chart of a monitoring method for a railway vehicle in accordance with an exemplary embodiment of the present disclosures.

FIG. 3 illustrates a flow chart of a monitoring method 300 for a railway vehicle in accordance with an exemplary embodiment of the present disclosures. The method 300 may be implemented utilizing for example an EOT 100 as described with reference to FIG. 1 and a monitoring system 200 described with reference to FIG. 2.

While method 300 is described as a series of acts or steps that are performed in a sequence, it is to be understood that the method 300 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method 300 starts at 310 and comprises an act 320 of illuminating, by a first monitoring device configured as an end of train device (EOT 100), a section of a surrounding area of the railway vehicle and receiving reflected light. Act 330 comprises obtaining data including time for the reflected light to return to the EOT, and act 340 comprises transmitting the data obtained by the EOT to a second monitoring device. The method may end at 350. As described before, the second monitoring device comprises a head of train device (HOT) 230, a remote server 250, and/or a remote (external) monitoring system 260.

In an embodiment, the method 300 further comprises visualizing the data which comprises visualizing and displaying the surrounding area on a display or computer screen in real time. Visualization/displaying may be accomplished utilizing a display or computer screen of the second monitoring device, e. g. HOT 230 or remote server 250, or may be accomplished via a stand-alone or separate display. For example, point cloud(s) and/or digital images or 3D reconstruction(s) of the monitored areas can be displayed in the locomotive via a display so that the locomotive engineer can monitor the areas and can act if necessary. The locomotive 214 in combination with integrated HOT 230 typically comprise a display or computer screen which may be used for displaying the monitored areas behind the train 210. In another example, a separate display or computer (for example a tablet or laptop computer) may be used for displaying.

The visualization device, for example external monitoring device 260 which can be a portable handheld device such as a tablet or smartphone, may also perform reconstructions/visualization of the signals or data collected and provided by the EOT 100. That means that the collected signals/data are transmitted to the external monitoring device 260, wherein the external monitoring device is able to create digital images and reconstructions of the surrounding area as we all as to display created digital images/reconstructions.

Upon detecting something unusual behind the train 210, the system 200 may automatically generate an alarm or message, for example a visual alarm via a display or an audio alarm via a speaker. In an example, The EOT 100 and illumination device 180 may detect an incoming train, identify such an incoming train as 'unusual pattern' and trigger an alarm.

In another embodiment, the system 200 may include artificial intelligence capabilities, for example self-learning capabilities. A self-learning module may be configured such that the system 200 learns, and continually improves, identification of unusual conditions and generate alarms accordingly.

The described EOT 100, system 200 and method 300 including LiDAR technology provide reliable solutions to monitor area(s) of interest, independently of the environment or time of day, for example in low illumination and/or adverse environmental conditions. Information captured by the EOT 100 comprising LiDAR technology is transmitted directly or indirectly to either a HOT 230 or to an external monitoring device or alternatively to a centralized control location for an operator to monitor the surroundings or the rear of the train 210. Obstructions presented by falling rain, snow or fog are virtually removed and enable proper visualization of the environment. As the illumination device 180 uses its own source of light and does not rely on external light sources to be able to scan the area under monitoring, allows to successfully operate at night or in situations where light conditions are extremely poor.

The invention claimed is:

1. An end of train device (EOT) for a railway vehicle, the EOT comprising:

a mounting unit for installation on a car of a railway vehicle, an enclosure housing a plurality of electronic components, and a LiDAR sensor configured to illuminate a section of a surrounding area of the railway vehicle, to receive reflected light and to measure time for the reflected light to return to the LiDAR sensor for monitoring purposes of the surrounding area, a processing unit integrated within the EOT and configured to process data and signals provided by the LiDAR sensor, create a point cloud of the surrounding area in real time during operation of the railway vehicle for detecting objects, accidents or approaching trains behind the railway vehicle, transmit the point cloud to a head of train device (HOT), remote server or external monitoring system, and automatically generate an alarm upon detecting an approaching train behind the railway vehicle.

2. The EOT of claim 1, wherein the illumination device comprises a transmitter and a receiver, wherein the transmitter is configured to emit light, and wherein the receiver is configured to receive the reflected light and to measure the time for the reflected light to return to the receiver.

3. The EOT of claim 1, comprising a global positioning system (GPS) receiver or a global navigation satellite system (GNSS) receiver to determine position and orientation of the illumination device.

4. The EOT of claim 1, comprising a communication module configured to transmit data including the measured time and position data to a head of train device (HOT), a remote server or an external monitoring system for further processing.

5. The EOT of claim 4, wherein the transmitted data include raw or partially processed time and position data, and wherein the HOT, remote server or external monitoring system is configured to process the time and position data, and to create a point cloud, image and/or reconstruction of the surrounding area.

6. The EOT of claim 4, wherein the communication module comprises a radio module configured to transmit the data via a radio-based telemetry link to the HOT.

7. A monitoring system for a railway vehicle, the monitoring system comprising:

a first monitoring device configured as end of train device (EOT), a second monitoring device, a communication link between the EOT and the second monitoring device, wherein the EOT comprises a LIDAR sensor configured to illuminate a section of a surrounding area of the railway vehicle, and to receive reflected light, wherein the EOT comprises a processing unit integrated within the EOT and configured to process data and signals provided by the LiDAR sensor, create a point cloud of the surrounding area in real time during operation of the railway vehicle for detecting objects, accidents or approaching trains behind the railway vehicle, wherein the EOT is configured to communicate the data and signals, provided by the LIDAR sensor, to the second monitoring device for monitoring of the surrounding area, and wherein the processing unit is further configured to automatically generate an alarm upon detecting an approaching train behind the railway vehicle.

8. The monitoring system of claim 7, wherein the second monitoring device is configured as a head of train device (HOT), and wherein the EOT and HOT are configured to communicate via a radio-based telemetry link.

9. The monitoring system of claim 7, wherein the second monitoring device comprises a remote server, a remote monitoring system, or an external monitoring system.

10. The monitoring system of claim 7, wherein the LiDAR sensor comprises a transmitter and a receiver, wherein the transmitter is configured to emit light, and wherein the receiver is configured to receive the reflected light and to measure time for the reflected light to return to the receiver.

11. The monitoring system of claim 10, wherein the first monitoring device is configured to transmit raw or partially processed signals and data provided by the LiDAR sensor to the second monitoring device for further processing including creating a point cloud, image and/or reconstruction of the surrounding area.

12. The monitoring system of claim 11, further comprising a processing unit configured to receive and process the raw or partially processed signals and data, wherein the processing unit is included in the second monitoring device or is a separate processing device.

13. The monitoring system of claim 7, wherein the first monitoring device comprises a global positioning system (GPS) receiver or a global navigation satellite system (GNSS) receiver to determine position and orientation of the LiDAR sensor.

14. The monitoring system of claim 7, further comprising a display for visualizing and displaying the point cloud, image and/or reconstruction of the surrounding area in real time.

* * * * *